(12) United States Patent
Hamada

(10) Patent No.: US 7,672,933 B2
(45) Date of Patent: Mar. 2, 2010

(54) INFORMATION PROCESSING APPARATUS, INFORMATION PROCESSING METHOD, PROGRAM, AND STORAGE MEDIUM

(75) Inventor: Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 11/301,846

(22) Filed: Dec. 13, 2005

(65) Prior Publication Data

US 2006/0143212 A1   Jun. 29, 2006

(30) Foreign Application Priority Data

Dec. 15, 2004   (JP) .............................. 2004-363675

(51) Int. Cl.
*G06F 17/30* (2006.01)
(52) U.S. Cl. .............................. 707/3; 707/101; 707/10; 707/6
(58) Field of Classification Search ................. 707/100, 707/101
See application file for complete search history.

(56) References Cited

U.S. PATENT DOCUMENTS

2004/0091114 A1 * 5/2004 Carter et al. ................. 380/259
2005/0131930 A1 * 6/2005 Jang et al. .................... 707/101
2006/0251246 A1 * 11/2006 Matsui ......................... 380/28

FOREIGN PATENT DOCUMENTS

JP   10-260903   9/1998

* cited by examiner

*Primary Examiner*—Cam Y T Truong
(74) *Attorney, Agent, or Firm*—Cowan, Liebowitz & Latman, P.C.

(57) ABSTRACT

In an information processing apparatus which can encrypt a file and can store the encrypted file at a predetermined location, an input file is separated into a header field and data field, and the separated data field is encrypted and saved in association with information included in the header field. In the meantime, a keyword required to specify the file is extracted from the separated data field, and the extracted keyword is converted into a hash value. The obtained hash value is stored in association with the information included in the header field. Upon storing a file, the contents of the file after storage can be prevented from being easily recognized by a third party.

4 Claims, 9 Drawing Sheets

INFORMATION PROCESSING APPARATUS, INFORMATION PROCESSING METHOD, PROGRAM, AND STORAGE MEDIUM

FIELD OF THE INVENTION

The present invention relates to an encryption processing technique of a file and a retrieval technique of the encrypted file.

BACKGROUND OF THE INVENTION

A server which has a file storage function of storing various files at predetermined locations, and a file retrieval function of retrieving a given file upon inputting only keyword data as needed is generally known.

As the concern about security is growing in recent years, files to be stored in the server are increasingly encrypted. If this is done, upon exchanging a hard disk due to its failure, the risk of leak of the file contents due to bringing out of the hard disk can be reduced.

For this reason, in recent years, a server which has a file encryption function of automatically encrypting the contents of a file upon writing the file is starting to appear (see, for example, Japanese Patent Laid-Open No. 10-260903). The file encryption function in such server, keyword data generated by the file encryption function, and a file retrieval function will be briefly explained below.

<Functional Block Arrangement of File Encryption Function>

FIG. 2 shows an example of the functional block arrangement of the file encryption function in the server. Referring to FIG. 2, a file encryption unit 200 encrypts a file. A volume disk 220 stores the encrypted file. A keyword disk 230 stores a keyword included in the file to be stored. Note that the example of FIG. 2 uses an NAS (Network Attached Storage) as each of the volume disk 220 and keyword disk 230.

A file write request 210 to the file encryption unit 200 is input to a file name/data separation unit 201, and is separated into a file name part 212 (file header field) and a file content part 211 (file data field). The file content part 211 is input to an encryption unit 203, is then encrypted, and is input to a file name/data combination unit 204. The unit 204 combines the file name part (212) and the encrypted file content part, and writes it in the volume disk 220. The reason why the file name part 212 is not encrypted is that a file to be backed up cannot otherwise be discriminated upon backing up the file.

Furthermore, the file encryption unit 200 shown in FIG. 2 also extracts a keyword included in a file. The file content part (211) extracted by the file name/data separation unit 201 is also input to a keyword extraction unit 205, and undergoes keyword extraction. A keyword extraction algorithm may adopt, for example, word extraction based on parsing, n-gram extraction, and the like. A keyword extracted by the keyword extraction unit 205 is input to a file name/keyword combination unit 207, is combined with the file name part separated by the file name/data separation unit 201, and is stored in the keyword disk 230.

<Configuration of Keyword Data>

The configuration of the keyword data generated using the file encryption function in the server will be described below. FIG. 3 shows an example of keyword data stored in the keyword disk 230. Keyword data 300 stored in the keyword disk 230 have, e.g., a table format, which stores data (302) of a file name (information included in a header field) and line that includes each extracted keyword (301). For example, as can be seen from FIG. 3, a keyword "Tokyo" is stored in the 26th line of file1.txt (see 302). Also, as can be seen from FIG. 3, a keyword "Sapporo" is included in two files, i.e., the fourth line of file3.doc (see 302) and 408th line of ccc.txt (see 303).

<Functional Block Arrangement of File Retrieval Function>

The file retrieval function of retrieving a file encrypted by the file encryption function in the server will be described below. According to the file retrieval function, keyword retrieval processing of a file encrypted by the file encryption unit 200 in FIG. 2 can be implemented using keyword data 300 stored in the keyword disk 230. FIG. 4 shows an example of the arrangement for this purpose. In FIG. 4, since the file encryption unit 200, volume disk 220, and keyword disk 230 have already been explained using FIG. 2, a description of them will be omitted. A file retrieval unit 401 searches the keyword disk 230 using a keyword 410 as an input and returns a result 411 to a client (not shown).

With the above arrangement, the server can automatically encrypt the contents of a file upon storing the file at a predetermined location.

According to the file encryption function of the server, keywords to be stored in the keyword disk 230 remain plaintext. This is because the keyword retrieval processing of the file retrieval function is disabled if keywords are encrypted.

However, if keywords to be stored in the keyword disk 230 remain plaintext, the administrator (i.e., server administrator) of the keyword disk 230 may estimate the contents of files stored in the volume disk 230.

On the other hand, upon encryption of keywords, for example, a "key" may be prepared, and keyword retrieval processing may be executed after the keywords are decrypted using the key. However, in such method, various other problems that pertain to key management such as a problem of key synchronization with the file retrieval unit 401 (the same encryption key must be used), a method of hiding the key, a method of updating the key, and the like are posed. For this reason, it is desirable to encrypt a file by a simple method, and to execute file retrieval processing of the encrypted file by a simple method.

SUMMARY OF THE INVENTION

The present invention has been made in consideration of the above problems, and has as its first object to prevent the contents of a file after storage from being recognized by a third party upon storing the file in an information processing apparatus which can encrypt the file and can store it at a predetermined location.

It is the second object of the present invention to allow simple keyword retrieval processing even when a file is stored so that its contents are not easily recognized by a third party in an information processing apparatus which can retrieve the stored file.

In order to achieve the above object, an information processing apparatus according to the present invention comprises the following arrangement. That is, an information processing apparatus which comprises a separation unit configured to separate an input file into a header field and a data field, and a save unit configured to encrypt the data field separated by the separation unit and to save the encrypted data field in association with information included in the header field, comprising:

a first conversion unit configured to extract a keyword for specifying the file from the data field separated by the separation unit, and to convert the extracted keyword into a function value by a predetermined one-way function; and a storage unit configured to store the function value obtained by the first conversion unit in association with information included in the header field separated by the separation unit.

According to the present invention, upon storing a file in an information processing apparatus which can encrypt the file and can store it at a predetermined location, the contents of the file after storage can be prevented from being easily recognized by a third party.

According to the present invention, even when a file is stored so that its contents are not easily recognized by a third party in an information processing apparatus which can retrieve the stored file, the file can be easily retrieved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<Hardware Arrangement>

The hardware arrangement of an information processing apparatus (server) according to an embodiment of the present invention will be described first using FIG. 5.

Figure 4:
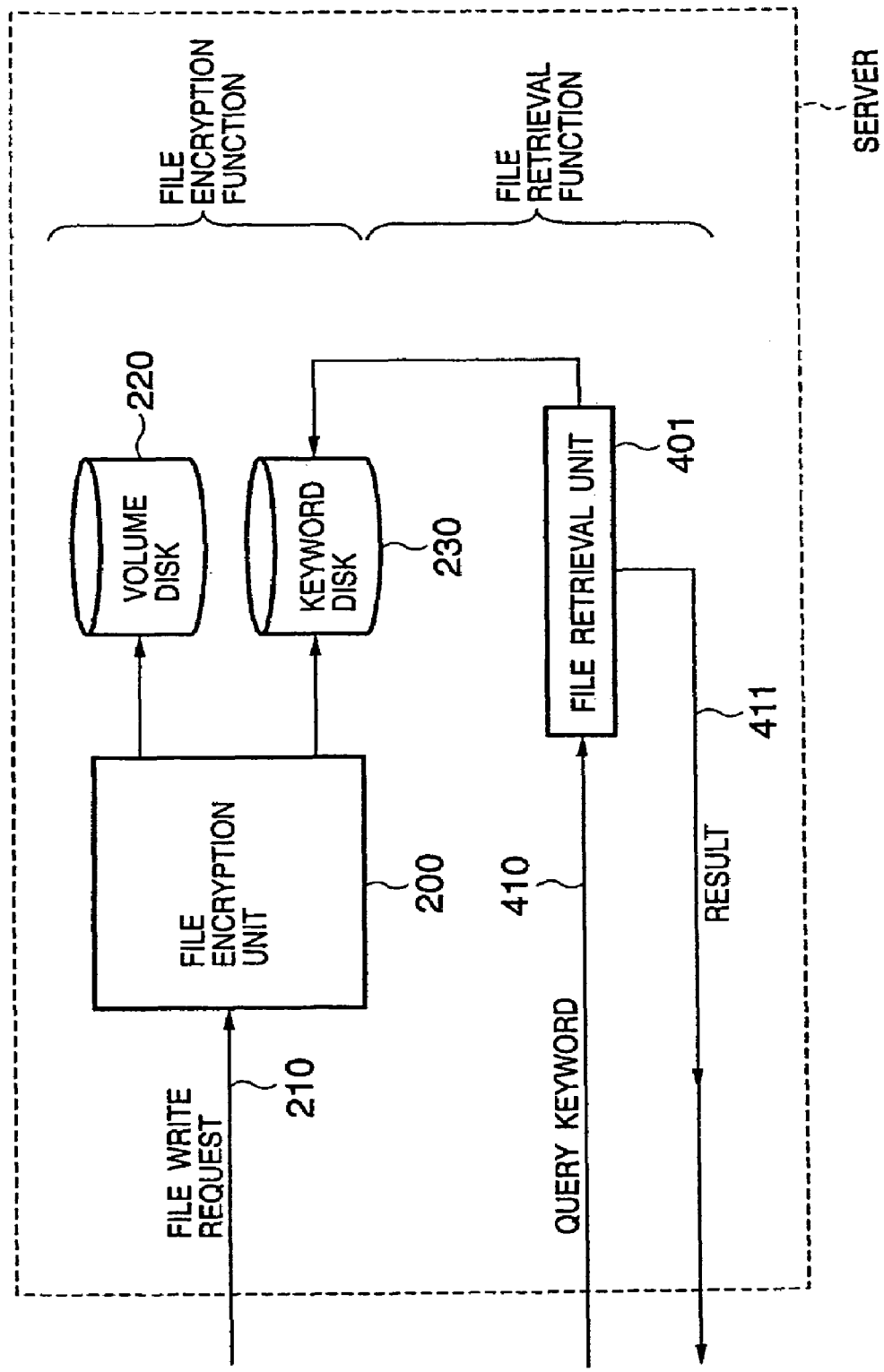
FIG. 4 is a block diagram showing an example of the functional block arrangement of the file encryption function and a file retrieval function in the conventional server.
Figure 5:
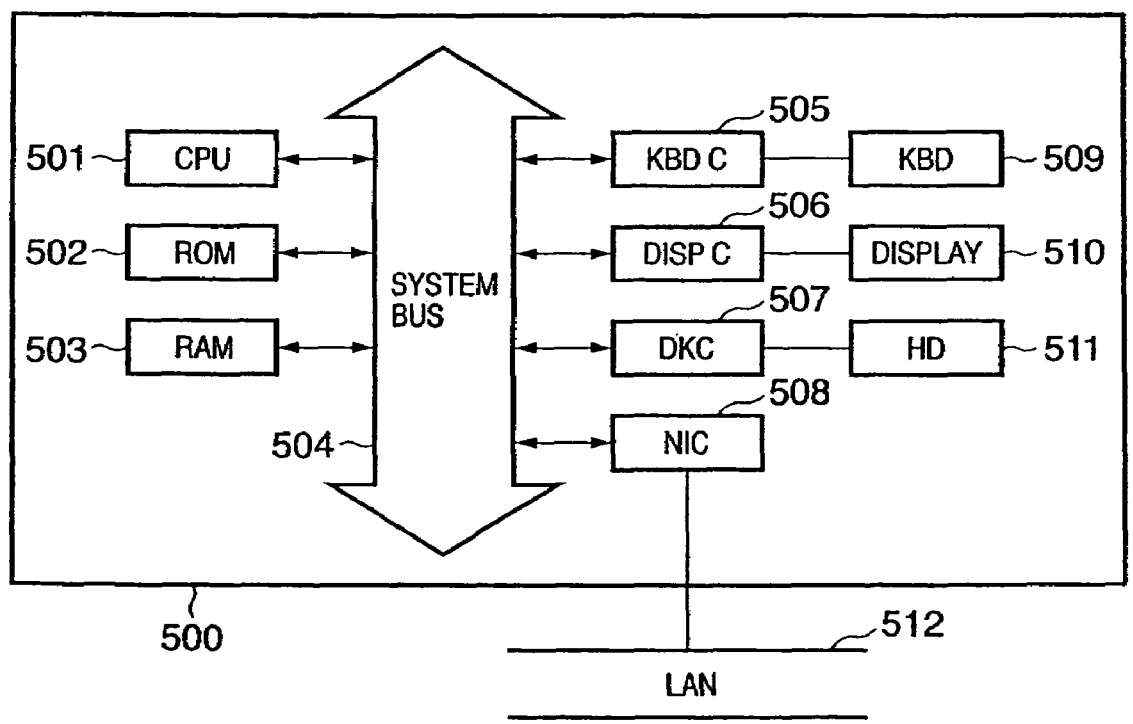
FIG. 5 is a block diagram showing the hardware arrangement of the server according to the embodiment of the present invention.

Referring to FIG. 5, a server 500 is equivalent to that shown in FIG. 4. The server 500 comprises a CPU 501 which executes software stored in a ROM 502 or hard disk (HD) 511. The CPU 501 systematically controls respective devices connected to the system bus 504.

A RAM 503 serves as a main memory, work area, or the like of the CPU 501. A keyboard controller (KBDC) 505 controls instruction inputs from a keyboard (KBD) 509. A display controller (DISPC) 506 controls display of a display (DISPLAY) 510. A disk controller (DKC) 507 controls access to the hard disk (HD) 511. A network interface card (NIC) 508 exchanges data with another network apparatus or another PC in two ways via a LAN 512.

By running a program for implementing a file encryption function (encryption program) or a program for implementing a file retrieval function (retrieval program) on this server 500, the file encryption and file retrieval functions can be implemented.

<Functional Block Arrangement of File Encryption Function>

Figure 1:
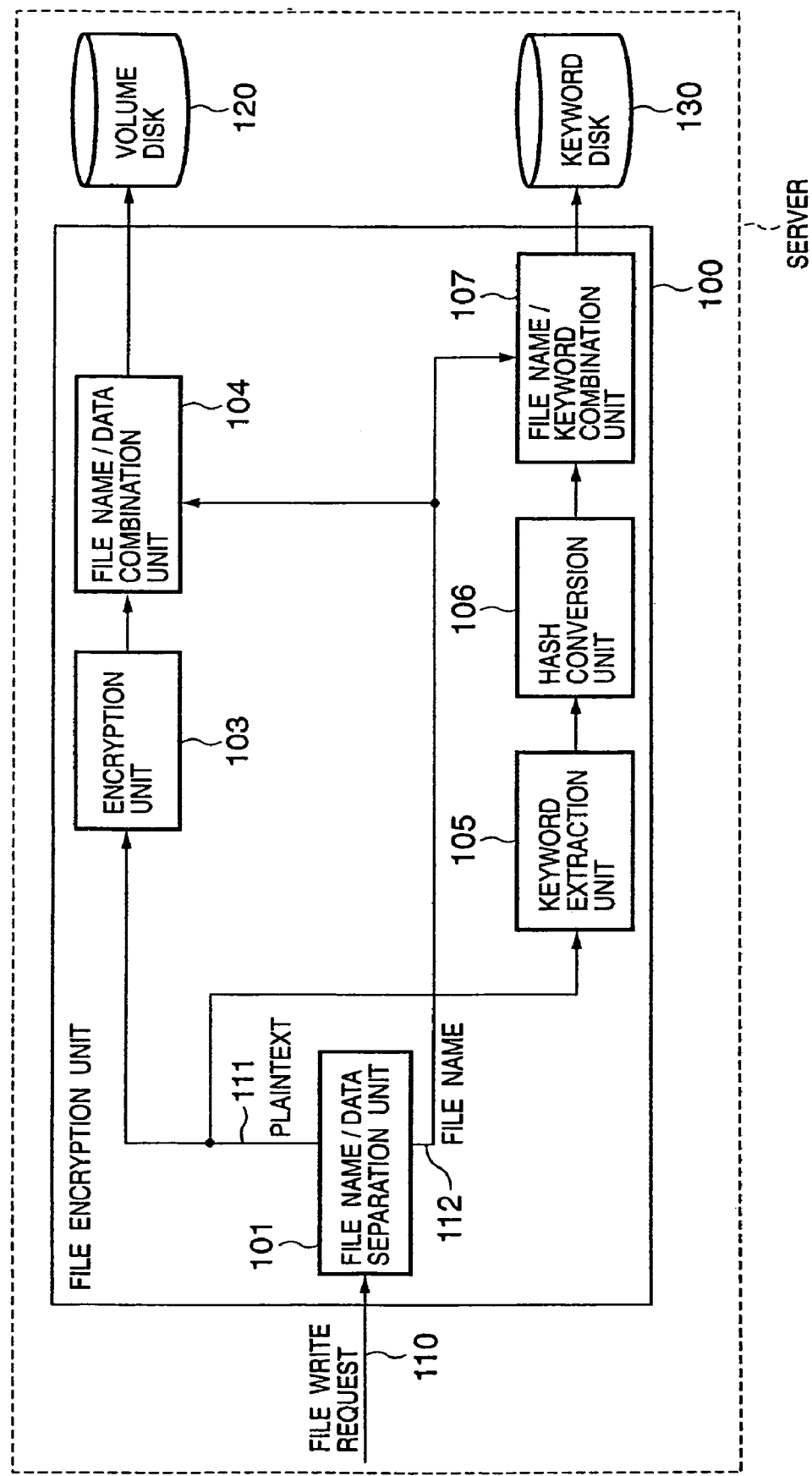
FIG. 1 is a block diagram showing an example of the functional block arrangement of a file encryption function in a server according to an embodiment of the present invention.
Figure 2:
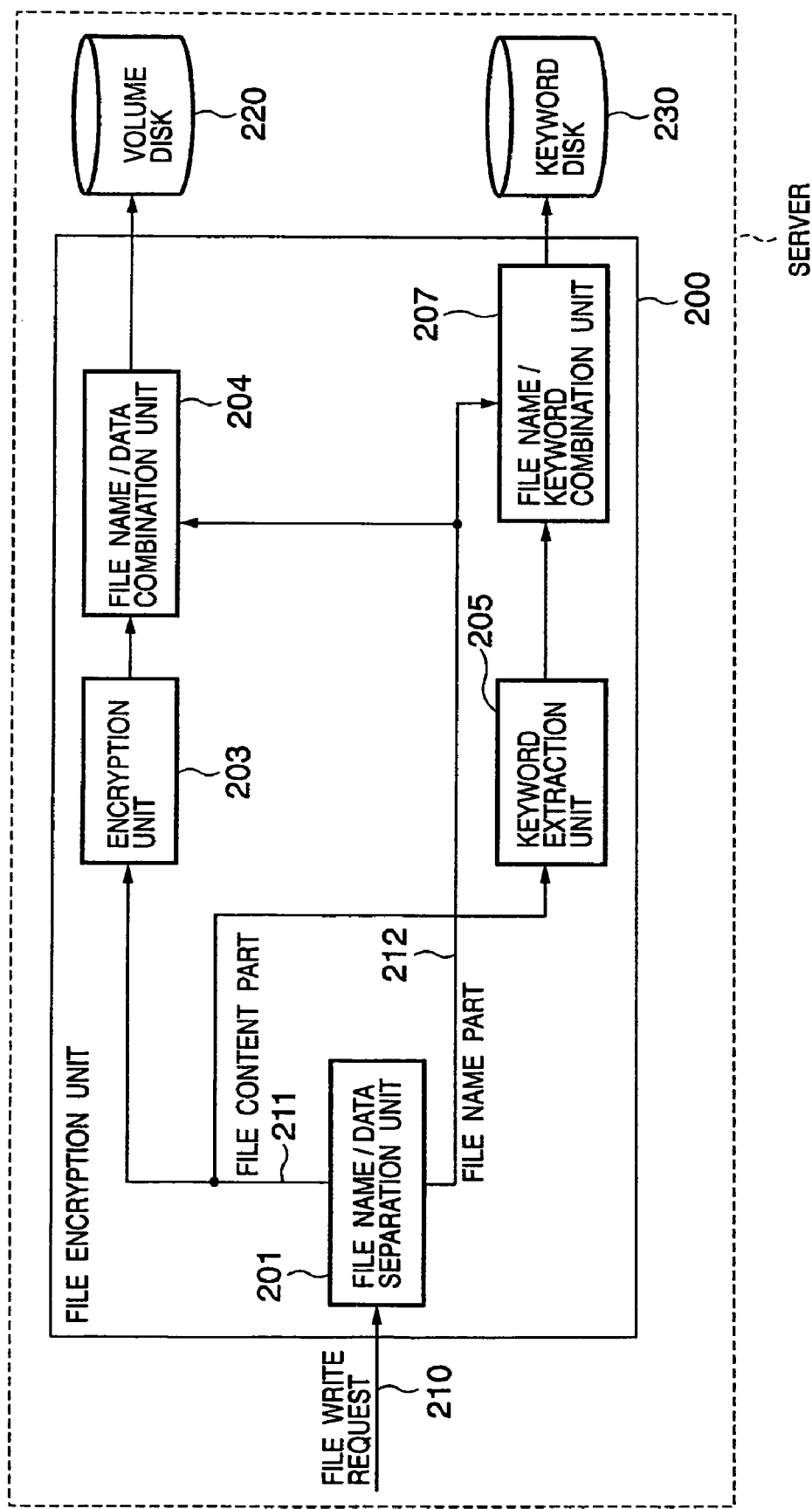
FIG. 2 is a block diagram showing an example of the functional block arrangement of a file encryption function in a conventional server.

FIG. 1 is a block diagram showing the functional block arrangement of the file encryption function in the information processing apparatus (server 500) according to the embodiment of the present invention.

Referring to FIG. 1, a file name/data separation unit 101, encryption unit 103, file name/data combination unit 104, keyword extraction unit 105, file name/keyword combination unit 107, file write request 110, volume disk 120, and keyword disk 130 respectively correspond to the file name/data separation unit 201, encryption unit 203, file name/data combination unit 204, keyword extraction unit 205, file name/keyword combination unit 207, file write request 210, volume disk 220, and keyword disk 230 and execute the same operations, a description thereof will be omitted.

A hash conversion unit 106 in FIG. 1 converts a keyword extracted by the keyword extraction unit 105 into a hash value using a hash function such as MD5, SHA-1, or the like.

The keyword converted into the hash value is combined with a file name by the file name/keyword combination unit 107, and is stored as keyword data in the keyword disk 130.

<Configuration of Keyword Data>

Figure 7:
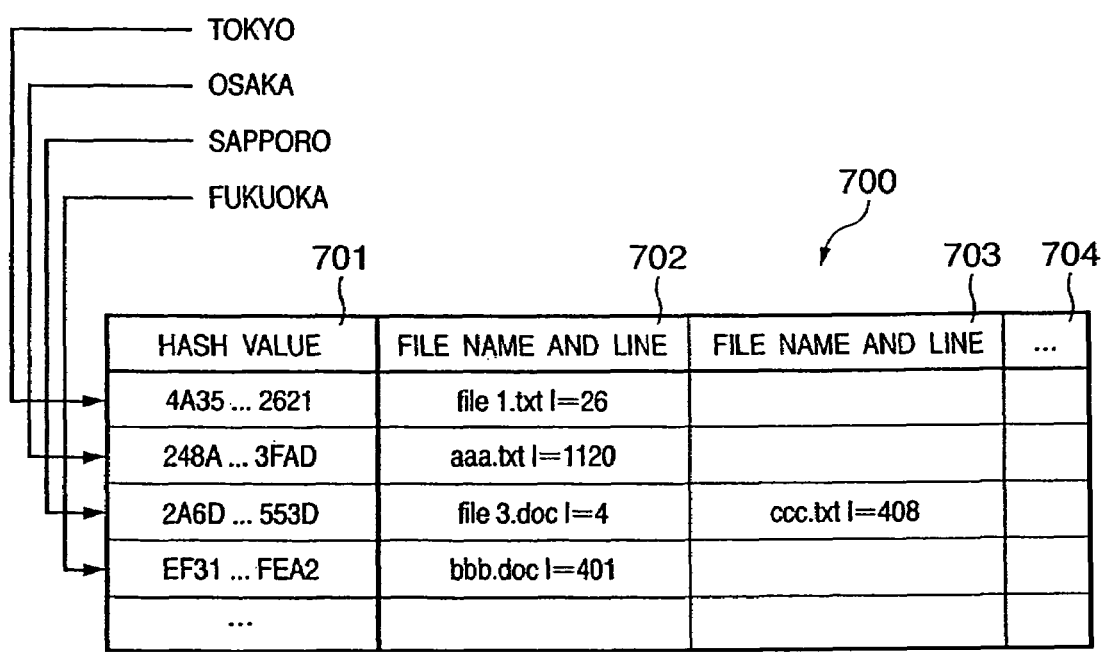
FIG. 7 shows an example of keyword data stored in a keyword disk.

FIG. 7 shows an example of keyword data 700 stored in the keyword disk 130. As shown in FIG. 7, a column 701 that stores hash values of keywords stores hash values corresponding to respective keywords. Since the hash values are stored in this way, it is impossible even for the administrator of the keyword disk 130 to estimate the contents.

Figure 3:
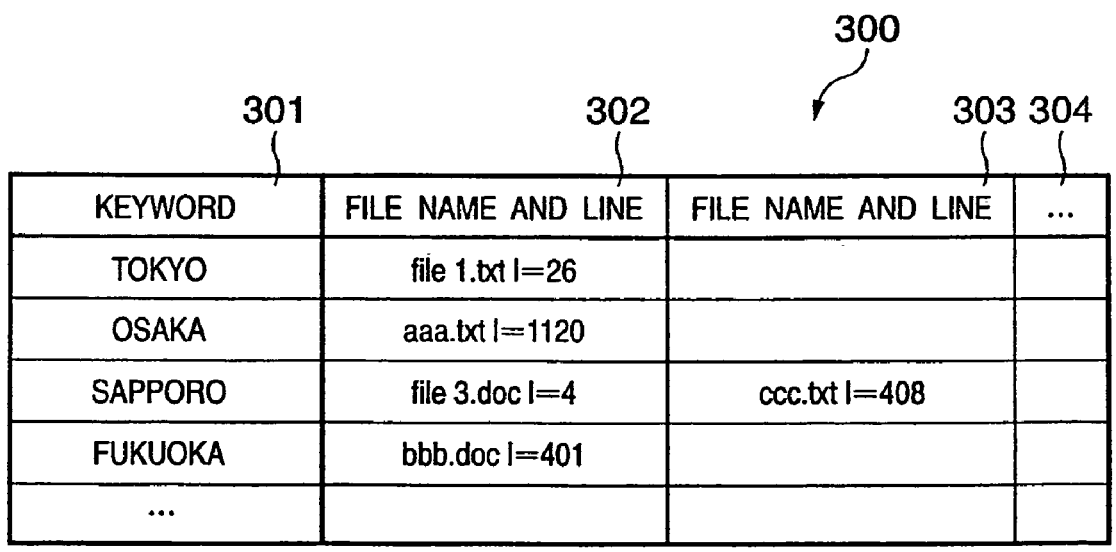
FIG. 3 shows an example of keyword data stored in a keyword disk in the conventional server.

Note that the keyword data 700 have the same format as that of the keyword data 300 in FIG. 3, and the only difference is whether the stored values are raw keyword data or hash values. For this reason, the server 500 that implements the file retrieval function and the algorithm of the file retrieval function can use substantially the same ones as in the conventional apparatus.

<Functional Block Arrangement of File Retrieval Function>

Figure 8:
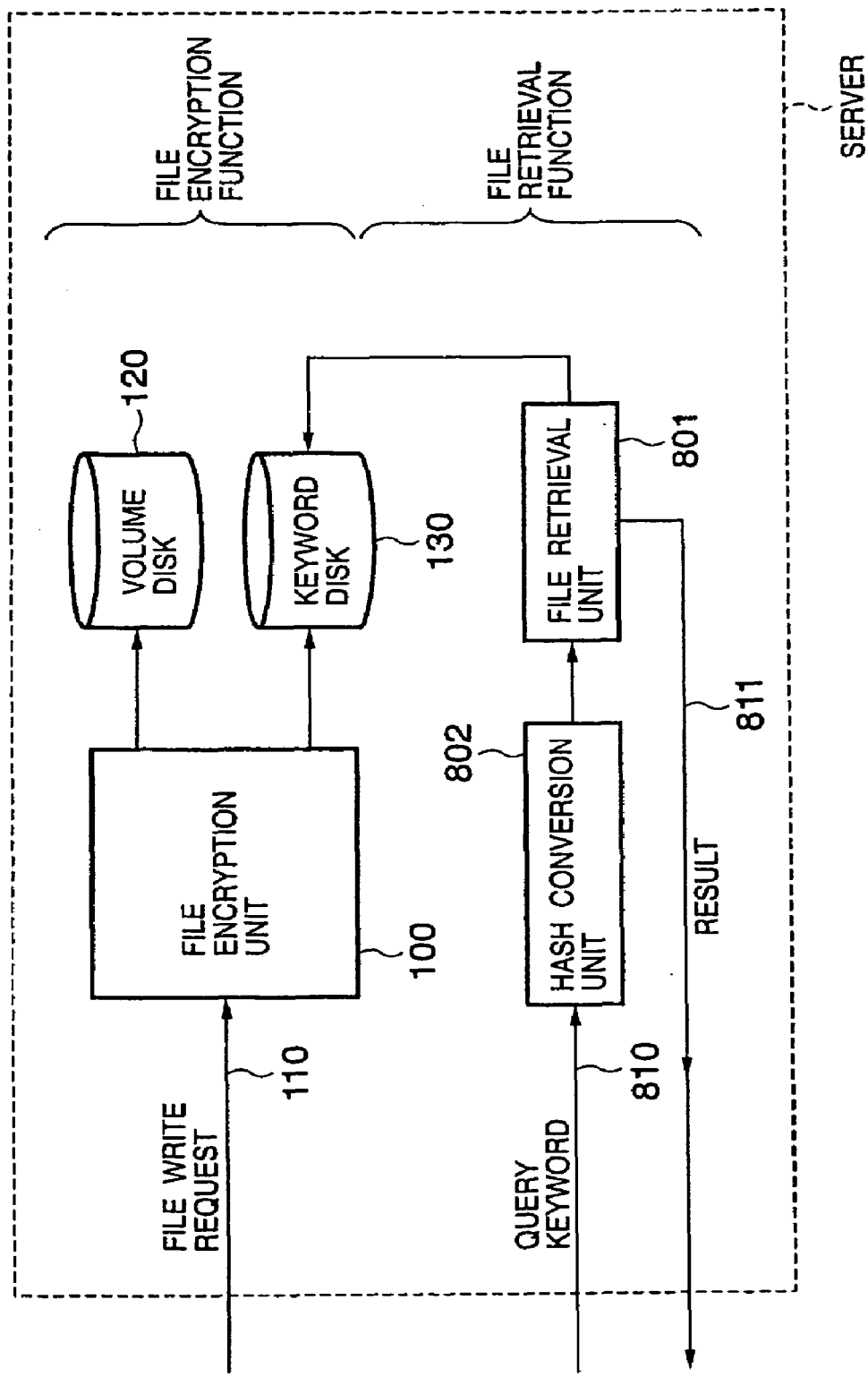
FIG. 8 is a block diagram showing the functional block arrangement of a file encryption function and a file retrieval function in the server according to the embodiment of the present invention.

FIG. 8 is a block diagram showing the functional block arrangement of the file encryption function and file retrieval function in the information processing apparatus (server 500) according to the embodiment of the present invention. Referring to FIG. 8, a hash conversion unit 802 outputs a hash value of a query keyword input by a client (not shown). In this case, as a hash algorithm, the same algorithm as that adopted in the hash conversion unit 106 in FIG. 1 is used.

The hash value output from the hash conversion unit 802 is input to a file retrieval unit 801. The file retrieval unit 801 executes retrieval by substantially the same algorithm as that described as the operation of the file retrieval unit 401 previously (details thereof will be explained later).

<Flow of File Retrieval Processing for Implementing File Retrieval Function>

Figure 6:
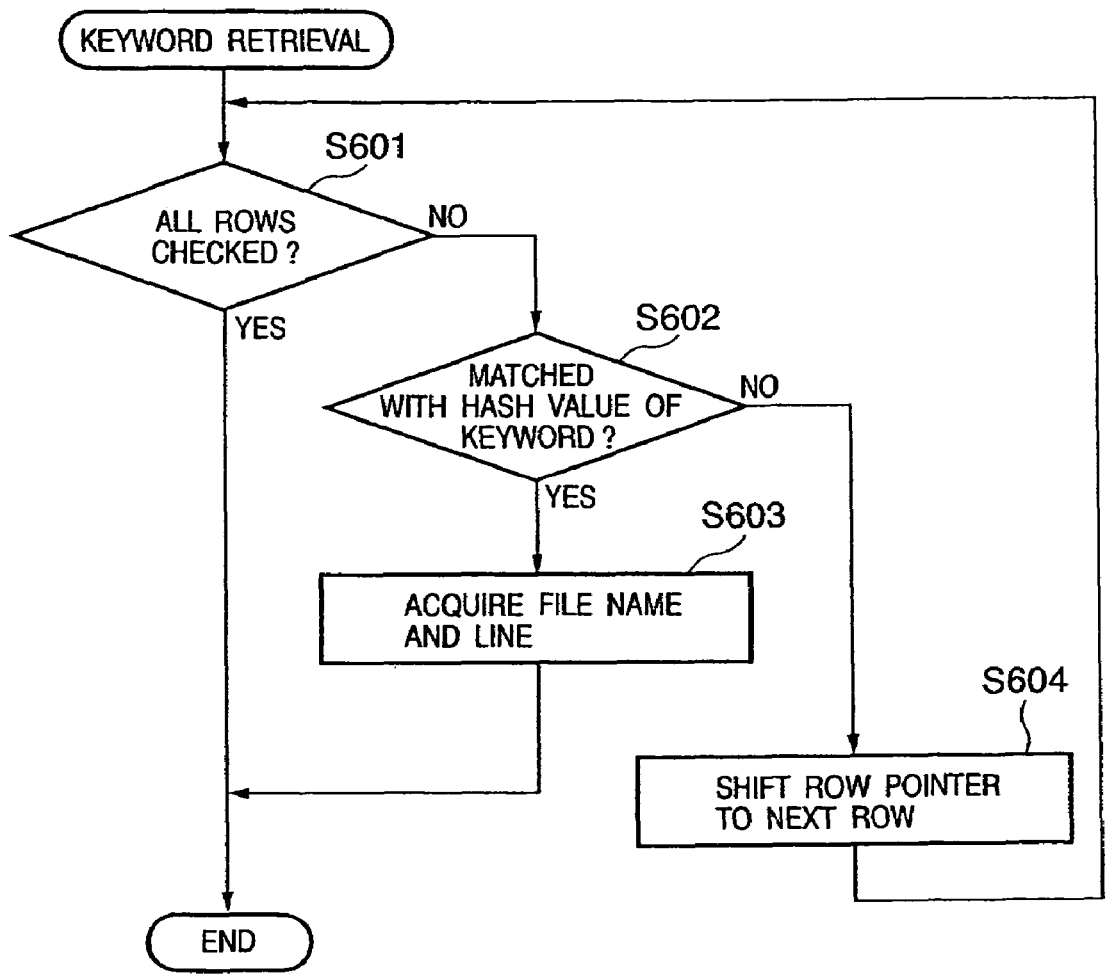
FIG. 6 is a flowchart showing the flow of file retrieval processing required to implement a file retrieval function in the server according to the embodiment of the present invention.

FIG. 6 shows the flow of file retrieval processing for implementing the file retrieval function. In this embodiment, assume that a Web service for retrieval is running on the server 500 upon executing the file retrieval processing. Also, assume that a query keyword is input via the LAN 512, and the retrieval result is returned via the LAN 512.

In the flowchart shown in FIG. 6, upon reception of a query keyword, it is checked in step 601 if all the rows of the keyword data 700 have been checked. If all the rows have been checked, the processing ends. On the other hand, if it is determined in step 601 that all the rows have not been checked yet, the flow advances to step 602.

In step 602, a hash value 701 of the row of interest is checked to see if the hash value of the query keyword is the same as the hash value 701. If the two values are the same, the flow advances to step 603.

In step 603, columns 702, 703, 704, . . . indicating a file name and line in that row are accessed to acquire the file name and line, which are returned as a retrieval result to a client (not shown).

On the other hand, if it is determined in step 602 that the hash values are not the same, the flow advances to step 604 to shift a row pointer to the next row so as to select the next row as the row of interest. The flow then returns to step 601 to continue the processing.

In the above embodiment, a keyword is converted into a hash value using the hash function. However, the present invention is not limited to the hash function, and a keyword may be converted using other one-way functions.

Other Embodiments

Note that the present invention may be applied to either a system or integrated apparatus constituted by a plurality of devices (e.g., a host computer, interface device, reader, and the like), or an apparatus consisting of a single equipment.

The objects of the present invention are also achieved by supplying a storage medium, which records a program code of a software program that can implement the functions (file encryption function, file retrieval function) of the above-mentioned embodiments to the system or apparatus, and reading out and executing the program code stored in the storage medium by a computer (or a CPU or MPU) of the system or apparatus.

In this case, the program code itself read out from the storage medium implements novel functions of the present invention, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

Figure 9:
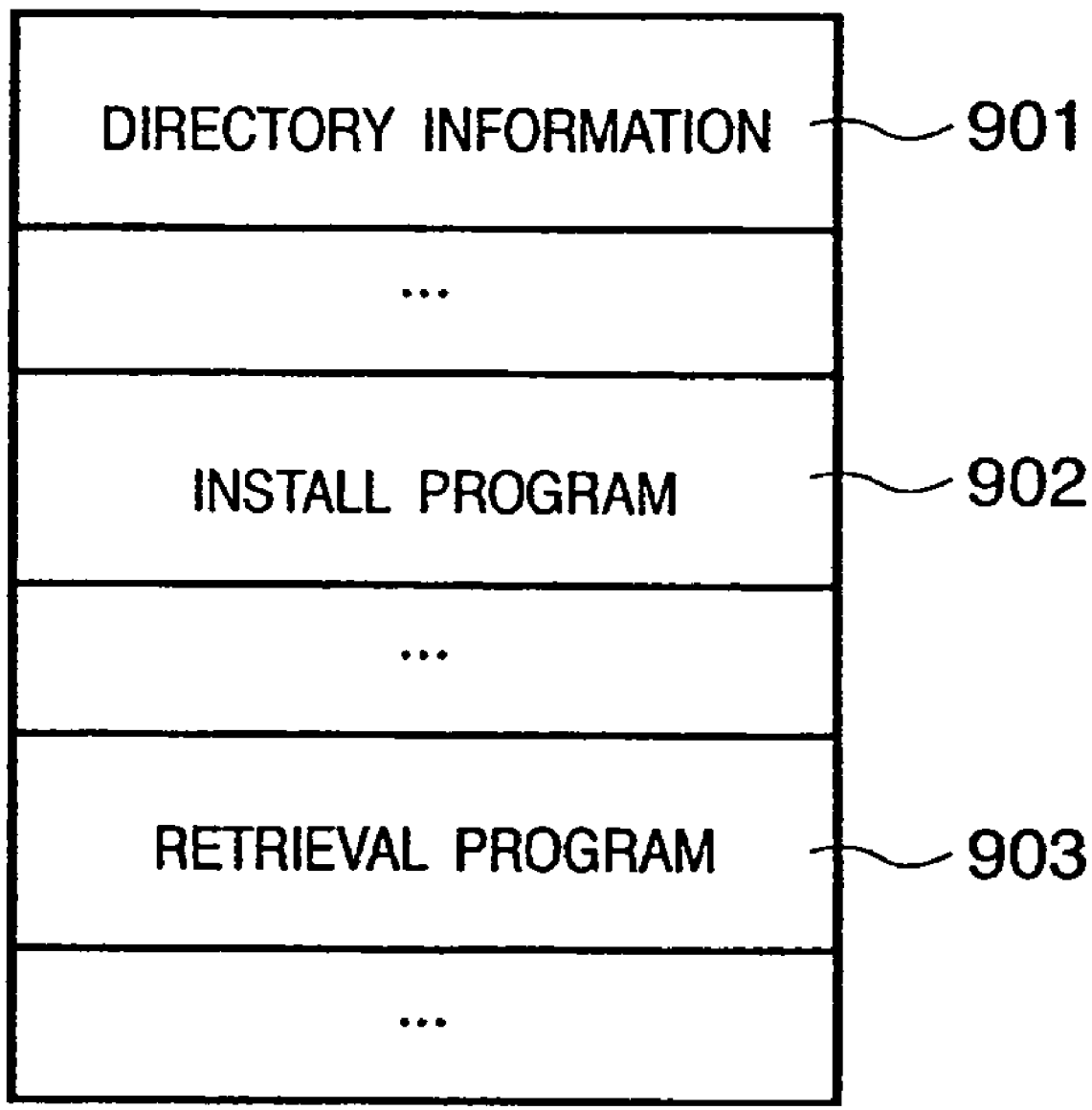
FIG. 9 shows an example of the memory map when a CD-ROM is used as a storage medium.

FIG. 9 shows an example of the memory map when a CD-ROM is used as a storage medium. Reference numeral 901 denotes an area which stores directory information and indicates the locations of an area 902 which stores an install program and an area 903 which stores a device control program. Reference numeral 902 denotes an area which stores an install program. Reference numeral 903 denotes an area which stores a retrieval program. Upon installing the retrieval program of the present invention to serve as the file retrieval function, the install program stored in the area 902 that stores the install program is loaded onto the server 500, and is executed by the CPU 501. The install program executed by the CPU 501 then reads out a device control program from the area 903 that stores the retrieval program, and stores it in the hard disk 511.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

Note that the present invention can be applied to a case wherein a program is delivered from a storage medium that records the program code of software which implements the functions of the aforementioned embodiments to a demander via a communication line such as PC communications.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-363675 filed on Dec. 15, 2004, which is hereby incorporated by reference herein.

What is claimed is:

1. An information processing apparatus comprising:
  a central processing unit (CPU);
  a server includes a storage medium that includes a install program having a predetermined one-way function and a file retrieval function;
  a separate unit configured to separate an input file into a header field and a data field;
  a save unit configured to encrypt the data field separated by the separation and save the encrypted data field in association with a file identifier included in the header field;
  an extraction unit configured to extract a plurality of keywords from the data field separated by the separation step;
  a first conversion unit configured to convert the plurality of extracted keywords into respective function values by the predetermined one-way function;
  file name/keyword combination unit configured to combine the extracted keywords, which are converted into the respective function values with file identifiers by a file name/keyword combination unit, are stored as keyword data in the storage medium, wherein the keyword data and the extracted keywords have a same format;
  a storage unit configured to store the respective function values that converted from the plurality of extracted keywords in correspondence with the file identifiers included in header fields that are separated;
  a second conversion unit configured to receive a query keyword from a client and to convert the received query keyword into a function value by the one-way function;
  a unit configured to upon reception of the query keyword, determines if rows of the keyword data have been checked, if all the rows are not checked. checking if the function value of the query keyword is same as respective a function value in the storage medium, if the two values are the same, indicating a file identifier and line in a row are accessed to retrieve the file identifier and line, if the two values are not the same, repeatedly shifting a row pointer to a next row as to select the next row;
  a retrieval unit configured to retrieve, from the storage medium, the function value which matches with the function value converted from the received query keyword by said second conversion step;
  an output unit configured to output the file identifier stored in said storage medium in correspondence with the function value retrieved by said retrieval step.

2. An information processing method comprising:
  storing an install program in a storage medium, wherein the program is loaded onto a server and the program includes a predetermined one-way function and a file retrieval function;

separating an input file into a header field and a data field;
encrypting the data field separated by the separation and saving the encrypted data field in association with a file identifier included in the header field;
extracting a plurality of keywords from the data field separated by the separation step;
converting the plurality of extracted keywords into respective function values by the predetermined one-way function;
combining the extracted keywords, which are converted into the respective function values with file identifiers by a file name/keyword combination unit, are stored as keyword data in the storage medium, wherein the keyword data and the extracted keywords have a same format;
storing the respective function values that converted from the plurality of extracted keywords in correspondence with the file identifiers included in header fields that are separated;
receiving a query keyword from a client and converting the received query keyword into a function value by the one-way function;
upon reception of the query keyword, determining if rows of the keyword data have been checked, if all the rows are not checked, checking if the function value of the query keyword is same as respective a function value in the storage medium, if the two values are the same, indicating a file identifier and line in a row are accessed to retrieve the file identifier and line,
if the two values are not the same, repeatedly shifting a row pointer to a next row as to select the next row;
retrieving, from the storage medium, the function value which matches with the function value converted from the received query keyword by said second conversion step;
outputting the file identifier stored in said storage medium in correspondence with the function value retrieved by said retrieval step.

3. A storage medium storing a control program which executed by a computer, causes the computer to perform steps comprising:
loading a program onto a server and the program includes a predetermined one-way function and a file retrieval function;
separating an input file into a header field and a data field;
encrypting the data field separated by the separation and saving the encrypted data field in association with a file identifier included in the header field;
extracting a plurality of keywords from the data field separated by the separation step;
converting the plurality of extracted keywords into respective function values by the predetermined one-way function;
combining the extracted keywords, which are converted into the respective function values with file identifiers by a file name/keyword combination unit, are stored as keyword data in the storage medium, wherein the keyword data and the extracted keywords have a same format;
storing the respective function values that converted from the plurality of extracted keywords in correspondence with the file identifiers included in the header fields that are separated;
receiving a query keyword from a client and converting the received query keyword into a function value by the one-way function;
upon reception of the query keyword, determining if rows of the keyword data have been checked, if all the rows are not checked, checking if the function value of the query keyword is same as respective a function value in the storage medium, if the two values are the same, indicating a file identifier and line in a row are accessed to retrieve the file identifier and line,
if the two values are not the same, repeatedly shifting a row pointer to a next row as to select the next row;
retrieving, from the storage medium, the function value which matches with the function value converted from the received query keyword by said second conversion step;
outputting the file identifier stored in said storage medium in correspondence with the function value retrieved by said retrieval step.

4. A control program stored in a storage medium for making a computer implement steps of:
separating an input file into a header field and a data field;
encrypting the data field separated by the separation and saving the encrypted data field in association with a file identifier included in the header field;
extracting a plurality of keywords from the data field separated by the separation step;
converting the plurality of extracted keywords into respective function values by the predetermined one-way function;
combining the extracted keywords, which are converted into the respective function values with file identifiers by a file name/keyword combination unit, are stored as keyword data in the storage medium, wherein the keyword data and the extracted keywords have a same format;
storing the respective function values that converted from the plurality of extracted keywords in correspondence with the file identifiers included in the header fields that are separated;
receiving a query keyword from a client and converting the received query keyword into a function value by the one-way function;
upon reception of the query keyword, determining if rows of the keyword data have been checked, if all the rows are not checked, checking if the function value of the query keyword is same as respective a function value in the storage medium, if the two values are the same, indicating a file identifier and line in a row are accessed to retrieve the file identifier and line,
if the two values are not the same, repeatedly shifting a row pointer to a next row as to select the next row;
retrieving, from the storage medium, the function value which matches with the function value converted from the received query keyword by said second conversion step;
outputting the file identifier stored in said storage medium in correspondence with the function value retrieved by said retrieval step.

* * * * *